United States Patent [19]

Romans et al.

[11] Patent Number: 5,012,526
[45] Date of Patent: May 7, 1991

[54] AUTOMATIC TOOL COMPENSATOR

[75] Inventors: William W. Romans, Ankeny; Dudley L. Lukehart, Des Moines, both of Iowa

[73] Assignee: Deere & Company, Moline, Ill.

[21] Appl. No.: 437,967

[22] Filed: Nov. 16, 1989

[51] Int. Cl.⁵ .................................................. A46B 13/02
[52] U.S. Cl. ...................................... 15/256.5; 15/21.1; 15/88.3; 51/165.87; 56/12.1; 56/DIG. 12
[58] Field of Search ....................... 15/21.1, 88.2, 88.3, 15/88.4, 256.5; 51/165.77, 165.87; 56/12.1, DIG. 12

[56] References Cited

U.S. PATENT DOCUMENTS

| | | | |
|---|---|---|---|
| 2,928,112 | 3/1960 | Nelson et al. | 15/88.3 |
| 4,382,308 | 5/1983 | Curcio | 15/88.3 |
| 4,604,835 | 8/1986 | Borin | 51/165.87 |

Primary Examiner—Edward L. Roberts

[57] ABSTRACT

Stroke adjustment method and apparatus for a tool such as a motor-driven wire brush utilized to remove "frost" from plated cotton picker spindles. The apparatus includes an arm pivotally connected at one end to a workstation and at the opposite end to a storke cylinder which moves the attached brush into contact with a workpiece. The stroke cylinder is attached to a sliding member which is indexed by a ratchet device in response to a signal indicative of current draw of the motor. As the average current draw drops below a preselected minimum level, the ratchet device is automatically indexed to advance the stroke cylinder and move the brush closer to the workpiece.

8 Claims, 2 Drawing Sheets

AUTOMATIC TOOL COMPENSATOR

BACKGROUND OF THE INVENTION

1. Field of the Invention

The present invention relates generally to manufacturing equipment and, more specifically, to a stroke adjuster for a tool such as a wire brush utilized to remove unwanted build-up from plated workpieces.

2. Related Art

Motor-driven tools, such as wire brushes used in processes to remove "frost" from plated workpieces such as cotton picker spindles, are typically mounted at a workstation and are moved by a cylinder into contact with the workpieces. Adjustment is provided by a screw which advances the tool to compensate for wear and assure proper brushing action. It has been common practice for operators to adjust the tool inwardly toward the workpieces, farther than actually required, to minimize the number of adjustments necessary. However, such a practice causes premature tool wear and unpredictable results.

BRIEF SUMMARY OF THE INVENTION

It is therefore an object of the present invention to provide an improved tool adjustment device. It is another object to provide such a device which maximizes tool wear while assuring proper tool action relative to workpieces. It is yet another object to provide such a device which automatically makes tool adjustments without operator intervention for more predictable results and increased productivity.

It is a further object of the present invention to provide an improved tool adjustment device which automatically adjusts the stroke on a moveable finishing tool. It is another object to provide such a device which is utilized with a stroke cylinder and obviates the need to adjust the length of the cylinder stroke.

It is a further object of the present invention to provide an improved tool adjustment method and device for automatically adjusting the stroke on a moveable finishing tool such as a wire brush to compensate for wear and the like to assure proper positioning of the tool relative to a workpiece. It is yet another object to provide such a method and device which provides more predictable finishing tool results on workpieces such as cotton picker spindles without need for operator intervention.

Stroke adjustment structure for a tool such as a wire brush driven by an electric motor includes an arm pivotally connected at one of its ends to a workstation and at its opposite end to a stroke cylinder which moves the attached brush into contact with a workpiece such as a plated cotton picker spindle. The stroke cylinder is attached to a sliding member which is indexed by a ratchet device in response to a signal indicative of current draw by the motor. As the average current draw drops below a preselected minimum level, the ratchet device is automatically indexed to advance the stroke cylinder and move the brush slightly closer to the workpiece.

Brush life is approximately twice that for the automatically compensated brush structure of the present arrangement as compared with previous manual methods of brush adjustment. More predictable brushing of "frost" from plated spindles is also achieved. Machine productivity is therefore significantly increased.

These and other objects, features and advantages of the present invention will become apparent to one skilled in the art upon reading the following detailed description in view of the drawings.

DETAILED DESCRIPTION OF THE DRAWINGS

Figure 1:
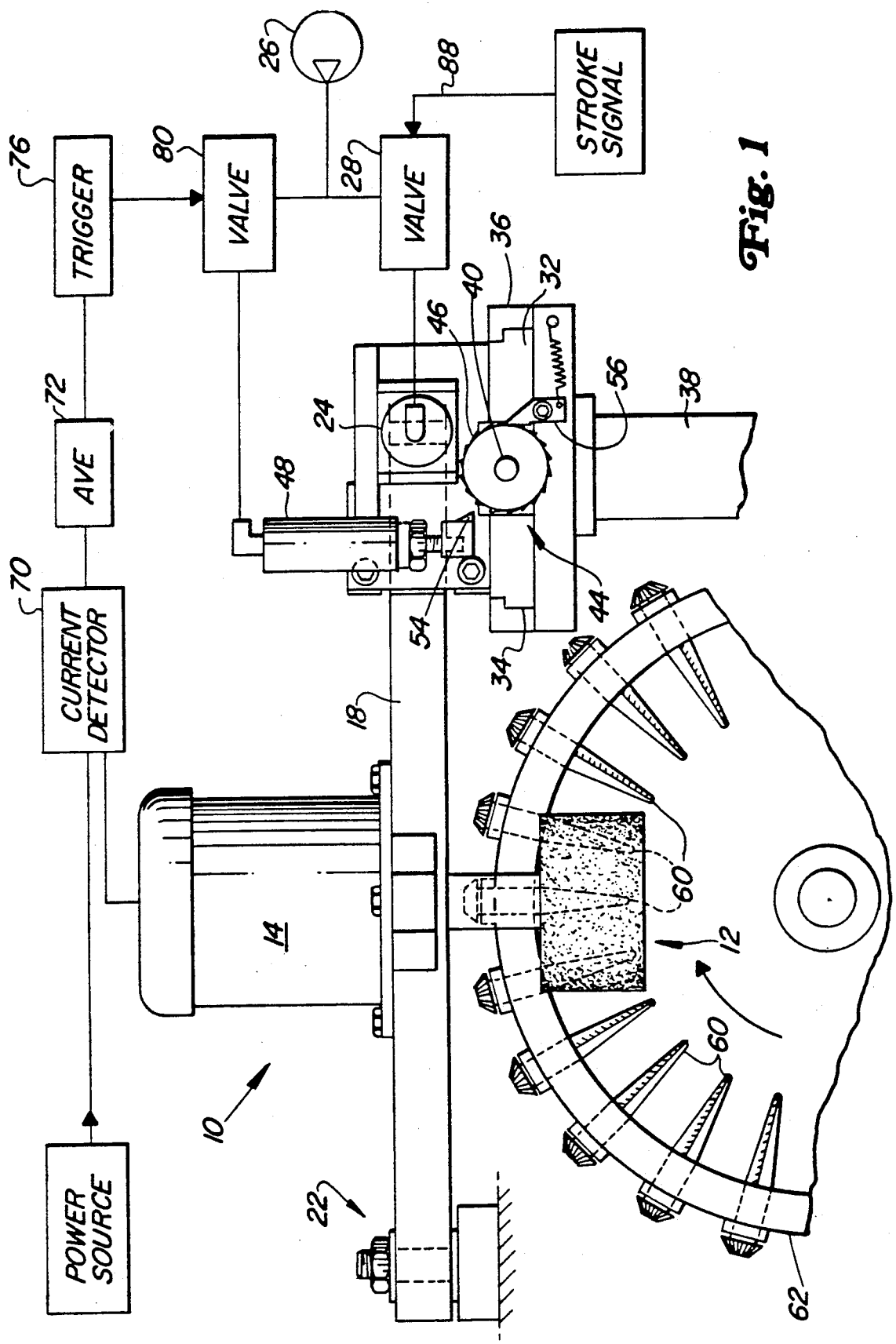
FIG. 1 is a side view of a rotating brush device with a stroke adjustment mechanism and showing schematically the control structure therefor.
Figure 2:
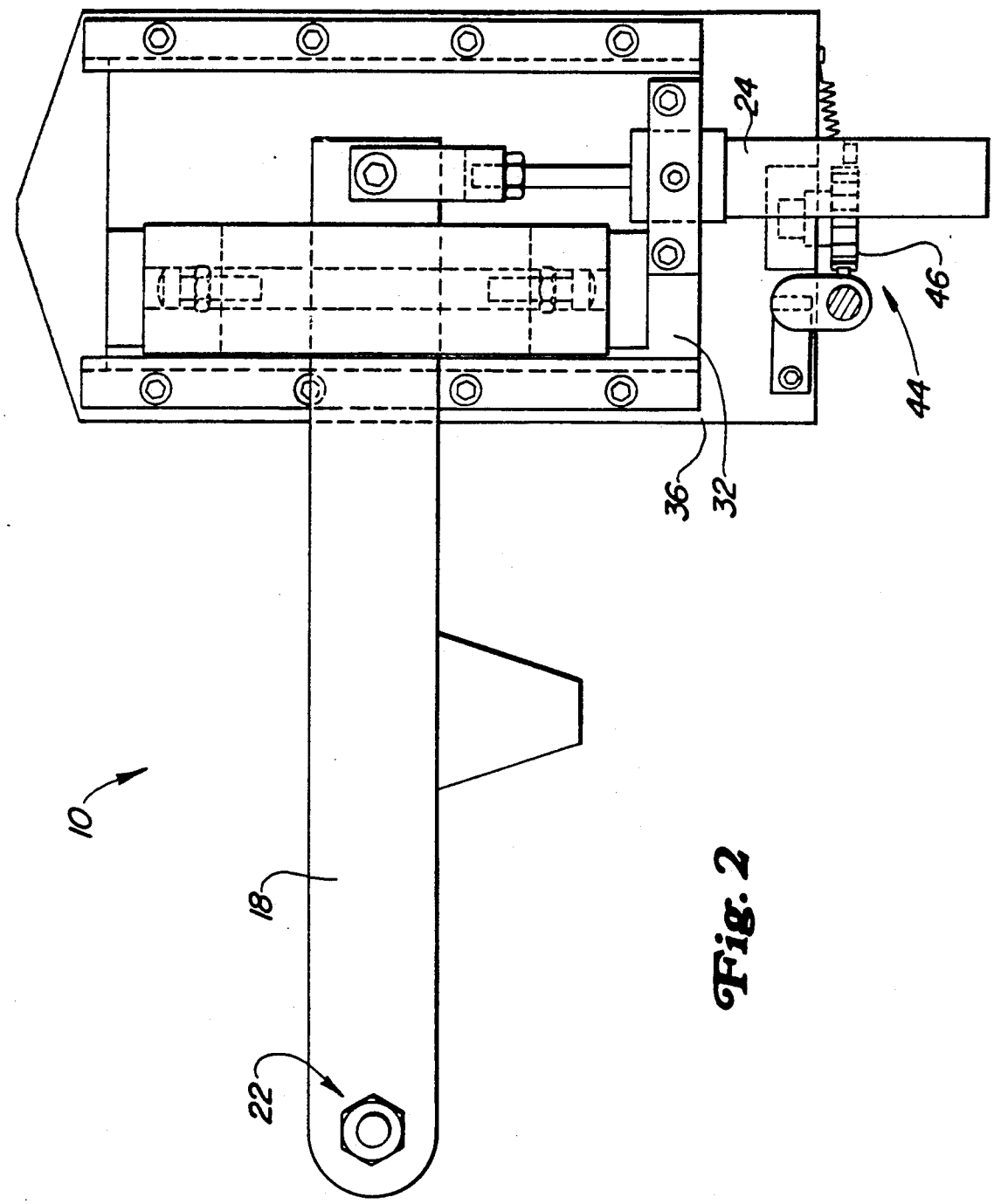
FIG. 2 is a top view of the stroke adjustment mechanism of FIG. 1.

Referring now to the drawing Figures, therein is shown a workstation 10 having a finishing tool 12, such as a wire brush, driven by an electric motor 14. The tool 12 is supported on a moveable arm 18 pivotally connected at one end by a pivot 22 to the workstation 10. The opposite end of the arm 18 is connected to the rod end of a conventional stroke cylinder 24 which, in turn, is connected to a source of air 26 through a control valve 28. The base end of the stroke cylinder 24 is supported on a moveable member 32 which is slidably received in a slotted portion 34 of a support base 36 for linear movement in a direction generally corresponding to the direction of extension of the cylinder 24. The support base 36 is also attached to the workstation 10 by mounting structure 38.

A threaded screw 40 is rotatably supported on the base 36 and is received within a corresponding threaded portion of the moveable member 32 so that rotation of the screw 40 moves the member 32 and the base end of the cylinder 24. A fine adjustment ratchet device indicated generally at 44 includes a ratchet wheel 46 fixed to the end of the screw 40 and a cylinder 48 connected to the base 36. A pawl 54 is connected to the rod end of the cylinder 48 and engages the ratchet wheel 46 to advance the screw 40 a fraction of a turn each time the cylinder 48 is actuated. A spring-biased keeper 56 prevents reverse rotation of the screw 40. As the screw 40 is advanced, the stroke cylinder 24 is moved to pivot the arm 18 and move the tool 12 closer to a workpiece, indicated generally at 60.

A turret 62 or other conventional indexing mechanism is utilized to advance workpieces 60 adjacent the tool 12. The cylinder 24 is activated to move the tool 12 into contact with the indexed workpiece 60. A drive (not shown) rotates the workpiece 60 in the turret 62 during the contact.

The electric motor 14 which drives the tool 12 is connected to a source of power through a current sensing device 70 which provides an indication of the current draw of the motor 14. An averaging circuit 72 is connected to the current sensing device 70 and samples the current at preselected intervals and averages the current for a preselected number of intervals. An indication of the average current drawn is provided at the output of the circuit 72, which is connected to the input of a triggering device 76. The output of the triggering device 76 is connected to a control input 78 of an electric control valve 80 connected between a source of air under pressure and the adjusting cylinder 48. If the average current indication for the sampling period falls below a preselected minimum level indicating that the load on the motor 14 is less than desired for proper tool action, the triggering device 76 detects this condition and activates the control valve 80 to move the ratchet wheel 46 and advance the screw 40 to move the tool 14 closer to the workpiece 60.

By way of example, the tool 12 is a wire brush and the workpiece 60 is a plated cotton picker spindle with "frost" that must be removed by the brush. The ratchet wheel 40 rotates one-sixteenth of revolution, and thread pitch of the screw 40 is selected such that the brush 12 moves about four one-thousandths of an inch closer to the workpiece each time the cylinder 48 is activated. Current draw of the motor 14 is sampled five times and averaged by the circuit 72. If the average value of the sensed current falls below the threshold level of the circuit 76, indicating that the tool 12 is contacting the workpiece 60 to lightly, the circuit 76 is triggered and sends an activating pulse to the electric control valve 80 to activate the cylinder 48. Activation of the cylinder 48 causes the ratchet device 44 to rotate the screw 40 and move the member 32 with the attached stroke cylinder 34. The arm 18 is rocked slightly about the pivot 22 to move the tool 12 slightly toward the workpiece 60 so that when the cylinder 24 is stroked the tool 12 will advance farther into the workpiece 60.

As the turret 62 advances a workpiece 60 adjacent the tool 12, a signal is provided at the input 88 of the valve 28 to stroke the cylinder 24 and move the tool against the workpiece. The averaging circuit 72 samples the motor current detected at 70 which will increase with increased tool loading. If the loading as determined by the averaging circuit 72 remains below a preselected level for the next set of samples, the trigger circuit 76 will again pulse the valve 80 and index the ratchet device 44. Indexing will continue until the average detected current reaches or exceeds the minimum level determined for proper tool action. The adjustment is relatively small compared to tool and workpiece size so that a precise tool positioning is achieved. Also, as a result of the very small incremental and periodic movement of the stroke cylinder support member 32, any discrepancies in the correlation between the average current reading and actual tool position (for example, caused by a current reading being sampled when the tool 12 is rotating without contact with a workpiece 60) will result in only a small overadjustment which is not detrimental to either tool action or tool wear.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a tool including an electrically driven finishing portion adapted for adjustable contact with a plated workpiece, wherein the current drawn by the finishing portion is indicative of the amount of contact between the finishing portion and the workpiece, tool positioning structure comprising:

means for supporting the workpiece adjacent the tool;

means including a stroke cylinder for supporting the workpiece and finishing portion for relative movement with respect to each other;

a moveable cylinder support connected to the stroke cylinder;

means for stroking the cylinder to move the workpiece and finishing portion into contact with each other;

means for providing a current signal indicative of the current draw of the finishing portion; and means responsive to the current signal for moving the cylinder support to thereby move the workpiece and finishing portion relative to each other in response to the current signal deviating beyond a preselected limit to reduce the current signal deviation.

2. The invention as set forth in claim 1 wherein the means for providing a signal comprises a current detector, and an averaging circuit connected to the detector for providing an average current signal.

3. In a tool including an electrically driven finishing portion adapted for adjustable contact with a workpiece, wherein the current drawn by the finishing portion is indicative of the amount of contact between the finishing portion and the workpiece, tool positioning structure comprising:

means for supporting the workpiece adjacent the tool;

means for supporting the workpiece and finishing portion for relative movement with respect to each other;

means for providing a current signal indicative of the current draw of the finishing portion;

means responsive to the current signal for moving the workpiece and finishing portion relative to each other in response to the current signal deviating beyond a preselected limit to reduce the current signal deviation; and wherein the means for supporting the workpiece and finishing portion for relative movement comprises an arm, and an extendible stroke cylinder connected to the arm of selectively moving the tool into contact with the workpiece, and wherein the means responsive to the current signal includes a cylinder support connected to the stroke cylinder for supporting the stroke cylinder in one of a plurality of positions dependent upon the current signal.

4. The invention as set forth in claim 3 wherein the means responsive to the current signal comprises means for moving the cylinder support in the direction of the stroke cylinder extension.

5. The invention as set forth in claim 4 wherein the means for moving the cylinder support includes an indexing mechanism for indexing the cylinder support in the stroke direction in increments that are relatively small compared with the dimensions of the workpiece.

6. The invention as set forth in claim 4 including a workstation support base, and wherein the cylinder support is slidably supported on the base.

7. In an electrically driven tool including a drivable portion adapted for contact with a workpiece, wherein the current drawn by the tool is indicative of the amount of contact between the tool and the workpiece, tool positioning structure comprising:

an arm member supporting the tool and selectively moveable with respect to the workpiece;

a stroke cylinder connected to the arm member for moving the tool into contact with the workpiece;

means for providing a signal indicative of the current draw of the tool; and means responsive to the current signal and connected to the member for moving the tool in response to the current signal deviating beyond a preselected limit, said means responsive to the current signal including an indexable cylinder support connected to the stroke cylinder for repositioning the stroke cylinder in response to the current deviations.

8. The invention as set forth in claim 7 including a support base, and wherein the arm member is pivotally connected to the support base and the stroke cylinder, and means for connecting the tool to the arm at a position radially offset from the pivotal axis so that repositioning of the stroke cylinder causes the angular position of the arm member and thus the tool location relative to the workpiece to change.

* * * * *